(12) United States Patent
Konnai

(10) Patent No.: US 6,335,096 B1
(45) Date of Patent: Jan. 1, 2002

(54) POTASSIUM TITANATE FINE PARTICLES

(75) Inventor: Hidefumi Konnai, Taito-ku (JP)

(73) Assignee: Kawatetsu Mining Co., Ltd., Tokyo (JP)

(*) Notice: Subject to any disclaimer, the term of this patent is extended or adjusted under 35 U.S.C. 154(b) by 0 days.

(21) Appl. No.: 09/519,461

(22) Filed: Mar. 6, 2000

(30) Foreign Application Priority Data

Mar. 8, 1999 (JP) ............................................. 11-103033

(51) Int. Cl.[7] ................................................ B32B 5/16
(52) U.S. Cl. ........................ 428/402; 423/598; 423/608; 423/641
(58) Field of Search .................. 428/402; 423/641, 423/608, 598

(56) References Cited

U.S. PATENT DOCUMENTS

| 4,652,439 A | 3/1987 | Nishiuchi et al. | |
|---|---|---|---|
| 6,036,938 A | * | 3/2000 | Konnai et al. .............. 423/592 |

FOREIGN PATENT DOCUMENTS

| JP | 56 014535 | 2/1981 |
|---|---|---|
| JP | 04 321517 A | 11/1992 |

OTHER PUBLICATIONS

Jung K et al., "Synthesis of High Surface Area Potassium Hexatitanate Powders by Sol–Gel Method", Journal of Sol–Gel Science and Technology, vol. 6, No. 3., Jan. 1, 1996, p.227–233.

Chemical Abstracts, vol. 118, No. 12, Mar. 22, 1993, Abstract No. 105869, Takahara Koichi et al." Alkali metal titanate powder, and its manufacture".

Database WPI, XP–002141316 & JP 04 091179 A, Mar. 24, 1992.

* cited by examiner

Primary Examiner—Hoa T. Le
(74) Attorney, Agent, or Firm—Oliff & Berridge, PLC

(57) ABSTRACT

Potassium titanate fine particles wherein the length is shorter than 5 μm, the content of the particles having the ratio of the length to the breadth is less than 3 is from 70 to 100% by number ratio, the diffraction intensity in the X-ray diffraction is low and the particles are low crystallinity, and the specific surface area thereof is from 20 to 50 $m^2/g$.

3 Claims, 3 Drawing Sheets

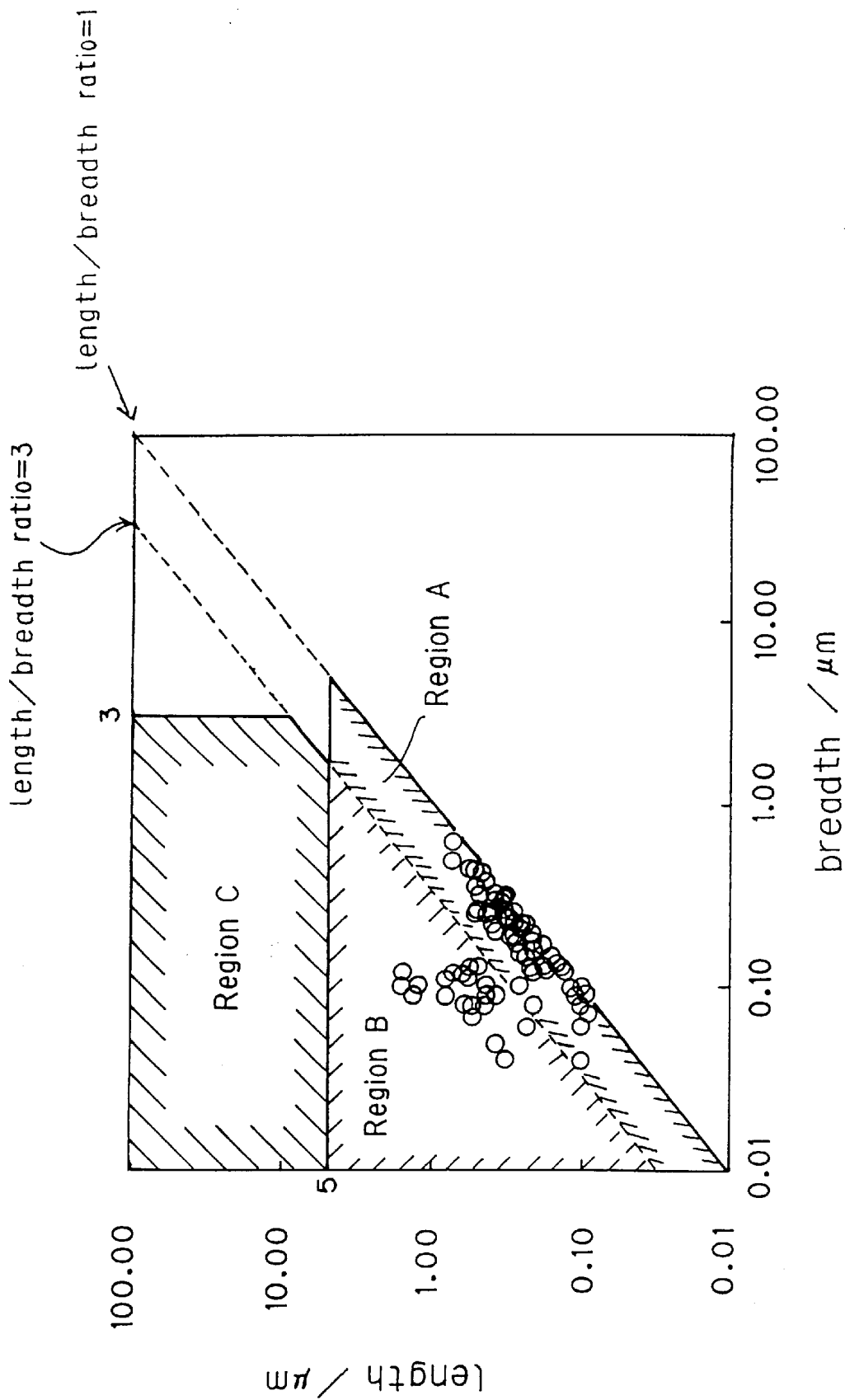

POTASSIUM TITANATE FINE PARTICLES

FIELD OF THE INVENTION

The present invention relates to potassium titanate which is used as an additive, etc., for plastics, friction materials, coating materials, lubricants, heat-resistant materials, heat-insulating materials, papers, etc., and particularly, to potassium titanate fine particles attaching importance to the configurational characteristics relative to a hygienic aspect.

BACKGROUND OF THE INVENTION

Potassium titanate has essentially a fibrous form having a length of from several Am to several tens $\mu$m, a diameter of 1 $\mu$m or shorter, and a specific surface area of less than 20 $m^2/g$, usually from about 5 to 10 $m^2/g$, and by utilizing the fibrous form, potassium titanate has been practically used mainly as a reinforcement in the fields of plastics, coating material, frictional materials, etc., and has come into wide use at present. However, the fibrous powder of potassium titanate has the properties that the powder is bulky, the fluidity is inferior, and is hard to handle. Furthermore, the fibrous powder is liable to generate dusts, which cause a problem in working environment.

The carcinogenicity of asbestos has become a problem and there is a viewpoint that the cause thereof relates to the fibrous form. With regard to not only asbestos but also fiber materials, according to the Stanton's hypothesis, it is said that fibers having a diameter of 0.25 $\mu$m or shorter and a length of 8 $\mu$m or longer have a high carcinogenicity. However, industrially useful fiber materials are utilized by establishing a standard in working environment. In ILO (International Labor Organization), fibers having a diameter of 3 $\mu$m or shorter, a length of 5 $\mu$m or longer, and the ratio of length to diameter of at least 3 are defined to be respirable fibers. Also, in AIA (Asbestos International Association) and DFG (Deutsche Forschungs Gemeinschaft), similar fibers are defined to be managed as fibrous dust.

The possibility that potassium titanate fibers give influences on the health of the respiratory organs, etc. is not clear, but when potassium titanate is used for the cases not requiring a fibrous use, it is desired that respirable fibers which are considered to be dangerous fiber size are not used.

SUMMARY OF THE INVENTION

The present invention has been made from the viewpoint of the safety and provides potassium titanate fine particles excellent in the configuration characteristics without having the form and the size of respirable fibers.

The invention has been developed for attaining the above-described object and provides potassium titanate fine particles made of the particles of potassium titanate having a length of shorter than 5 $\mu$m.

Also, it is preferred that in the potassium titanate fine particles of the invention, the fine particles of potassium titanate having the length of shorter than 5 $\mu$m and the ratio of the length to the breadth is less than 3 are from 70% to 100% by particle number.

Because the fibers having a length size of at least 5 $\mu$m are defined to be respirable fibers in the standard of ILO, etc., the length of the potassium titanate fine particles is limited to shorter than 5 $\mu$m in this invention.

BRIEF DESCRIPTION OF THE DRAWINGS

FIG. 4 is a graph showing the distributions of the particle size of the potassium titanate fine particles of the example.

DETAILED DESCRIPTION OF THE INVENTION

Figure 1:
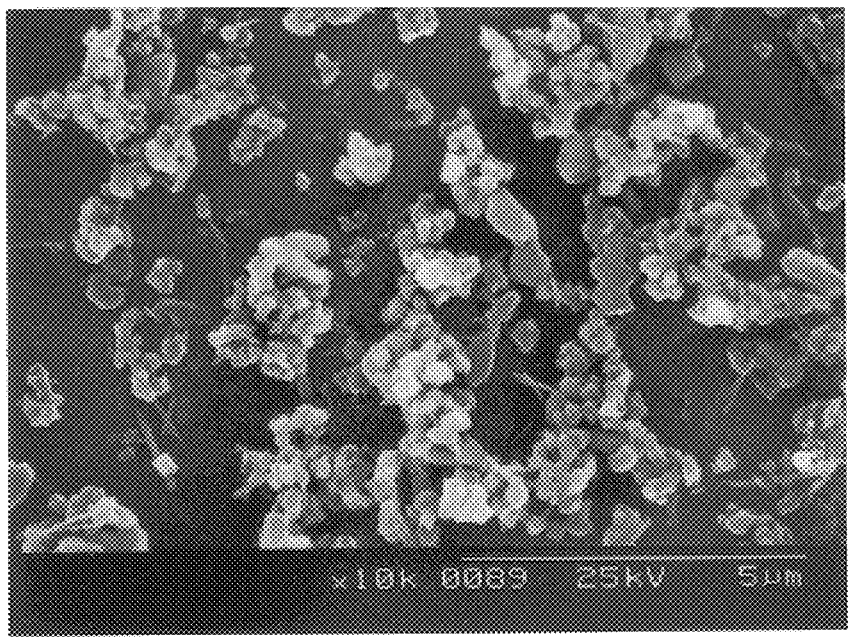
FIG. 1 is a microphotograph of 10,000 magnifications of the potassium titanate fine particles of the example of the invention.

Then, the invention is described in detail.

The potassium titanate fine particles of the invention are outside the standard of respirable fibers defined by ILO, etc., but taking into consideration of higher safety, the content of the fine particles of potassium titanate having the above-described length and the ratio of the length to the breadth is defined to be from 70% to 100% by particle number.

Furthermore, it is preferred that the specific surface area of the potassium titanate fine particles of the invention is from 20 to 50 $m^2/g$. The specific surface area of potassium titanate of prior art is usually from 5 to 10 $m^2/g$ and is, at the maximum, less than 20 $m^2/g$, but in the invention, the specific surface area is defined to be from 20 to 50 $m^2/g$, which is far larger than the specific surface area of prior art. Potassium titanate particles having small particle size and a large specific surface area are superior in the dispersibility, the reactivity, the catalysis, etc., but because when the specific surface area exceeds 50 $m^2/g$, the production cost of such potassium titanate fine particles becomes high and also there is no merit in the characteristics, the upper limit of the specific surface area of the potassium titanate fine particles of the invention is defined to be 50 $m^2/g$.

Potassium titanate of the invention is shown by the formula, $K_2O \cdot nTiO_2$ (n=1 to 8). The potassium titanate fine particles of the invention having the above-described characteristics can be produced by heating a mixture of a K source such as $K_2CO_3$, etc., and a Ti source such as $TiO_2$, etc., to form fine particles having a length of shorter than 5 $\mu$m, adding water to the fine particles to form a slurry, adding an acid to the slurry to dissolve off excessive $K^+$ ion and to control the product to a desired composition, and after dehydrating, heat treating the dehydrated product.

The potassium titanate fine particles thus obtained show, in the X-ray diffraction, a weak diffraction intensity and a diffraction line having a wide FWHMC full width at half maximum, which show that the potassium titanate fine particles are poor in crystallinity and are not in fibrous form. As one of the features of the diffraction pattern, it is recognized that the diffraction intensity of (200)/(310) is 3 or lower.

In addition, the potassium titanate fine particles practically produced in the invention may contain tabular particles having a thin thickness in the range of giving no problems in use and also small amounts of the K source, unreacted $TiO_2$, and $TiO_2$ formed by the thermal decomposition of potassium titanate may coexist in the potassium titanate fine particles of the invention to the extents of being qualitatively detected by X-ray diffraction. Furthermore, the potassium titanate fine particles of the invention as the industrial product may contain secondary particles formed by aggregating the primary particles to some extent.

Furthermore, when the K source as the raw material is changed to an Na source such as $Na_2CO_3$, etc., sodium titanate fine particles can also be obtained.

Because the potassium titanate of the invention are fine particles, the particles form a uniform sliding surface and have excellent frictional characteristics as a brake material, etc. Also, when the potassium titanate fine particles of the invention are compounded with a plastic or the like, a material suitable for precise moldings having a high dimensional precision is obtained. Furthermore, because the potassium titanate fine particles of the invention can be largely compounded and have a high specific surface area as compared with fibrous potassium titanate, the application by utilizing these properties in the area where reinforcing property is not required is expected.

Potassium titanate has properties such as a high whiteness, a low Mohs' hardness, a low heat conductivity, and a high refractive index, and also has the characteristics as a material excellent in the heat resistance, the chemical resistance, and the frictional character. Accordingly, the potassium titanate fine particles of the invention can be utilized, in addition to the use as a reinforcement, as an additive for plastics, friction materials, coating materials, paper, etc., and as a lubricant, a heat-resisting material, an electric insulating material, an ion exchange material, a catalyst, etc. Furthermore, while fibrous powder of potassium titanate in prior art is bulky, has an inferior fluidity, and is hard to handle, the potassium titanate fine particles of the invention do not have these faults and thus the applicable range thereof is wider. Moreover, in the case of applying the potassium titanate fine particles of the invention, a surface treatment such as a coupling agents, etc., can be applied to the potassium titanate fine particles according to the purposes, and also the potassium titanate fine particles can be granulated as required.

Because by compounding the potassium titanate fine particles of the invention with a plastic, etc., friction-resisting and wear resistance characteristics can be imparted to the plastic, etc., the compounded material is suitable for sliding parts, etc.

Also, it has been found that when the potassium titanate fine particles of the invention is used for a friction material such as a brake, etc., the material shows an excellent frictional performance such that the coefficient of friction is stabilized, etc. The reason thereof has not yet been clarified but it is considered that the effect is caused by the characteristics of the potassium titanate fine particles of the invention.

Then, the invention is explained practically by the following examples.

EXAMPLES 1 TO 3

By changing the compounding ratio of $K_2CO_3$ and $TiO_2$ and the heating condition, three heated products each having a different particle size distribution were obtained. Then, water was added each heated product to form a slurry, and after dissolving off a $K^+$ ion by adding HCl to the slurry, whereby the mol ratio of $TiO_2/K_2O$ was controlled, a heat treatment was applied to obtain $K_2O.8TiO_2$ fine particles.

In this case, the form of the particles are determined by first heating and the particle form is not substantially changed by the formation of the slurry, the composition control, and the heat treatment which are the steps following heating.

When a mixture of the K source ($K_2CO_3$) and the Ti source ($TiO_2$) is heated in an ordinary manner, by the crystal growth, potassium titanate particles having a length of at least 5 μm and the ratio of the length to the breadth of 3 or more are formed. Accordingly, the ordinary potassium titanate particles have a fibrous form.

On the other hand, the potassium titanate fine particles of the invention can be obtained by producing the particles by lowering the initial heating temperature to a relatively low temperature near the lowest temperature at which the heating reaction proceeds, and restraining the heating time to a short time within which the crystal growth does not proceed.

The electron microscopic images of the $K_2O.8TiO_2$ fine particles obtained were subjected to image processing, and the length and the breadth, and the length/breadth ratio of each particle were obtained, whereby the ratio of the particle having the length/breadth ratio of less than 3 to the particle having the length/breadth ratio of at least 3, the minimum value, the maximum value, and the average value of them were determined.

Also, the specific surface area of the potassium titanate fine particles of the invention thus obtained was obtained by a BET method by an $N_2$ gas adsorption. The diffraction intensity ratio of (200)/(310) was obtained by a powder X-ray diffraction measurement. The results obtained are shown in Table 1 below.

Figure 2:
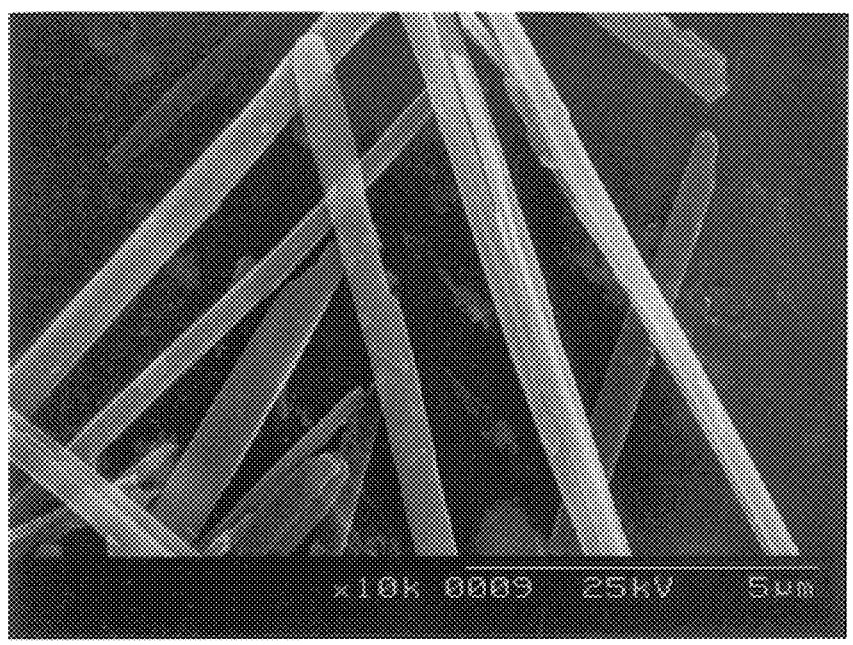
FIG. 2 is a microphotograph of 10,000 magnifications of the potassium titanate fiber of the comparative example.

FIG. 1 is a typical microphotograph of 10,000 magnifications of the potassium titanate fine particles of the invention obtained in Example 1 and FIG. 2 is a microphotograph of 10,000 magnifications of ordinary potassium titanate fiber of prior art shown as a comparative example. As is clear from these results, the potassium titanate fine particles of the invention of Example 1 are indefinite fine particles having the length of shorter than 5 μm and the length/breadth ratio of less than 3, containing small amounts of tabular particles and acicular fine particles having the length/breadth ratio of 3 or larger. On the other hand, the potassium titanate fiber of prior art shown in FIG. 2 have a long fibrous form wherein the fiber diameter is 3 μm or shorter and the length thereof is 5 μm or longer.

In the potassium titanate fine particles obtained in Examples 1 to 3, as shown in Table 1, particles having a length of 5 μm or longer were not observed.

Figure 3:
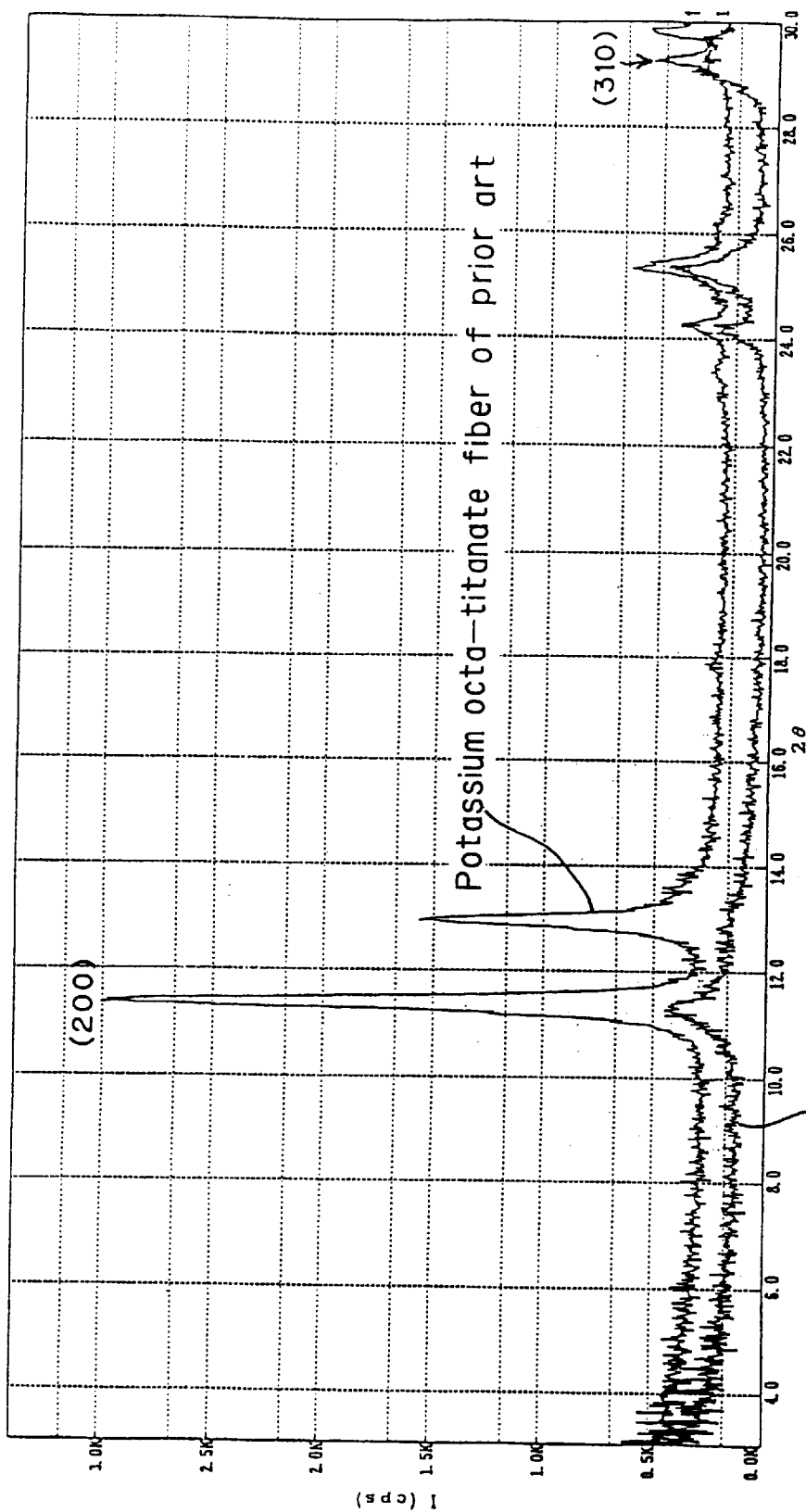
FIG. 3 is a graph showing X-ray diffraction patterns of the potassium titanate fine particles of the invention and those of prior art.

Then, X-ray diffraction patterns of both the potassium titanate fine particles were shown in FIG. 3. In addition, the slit used for the X-ray diffraction measurement is as follows; DS=1°, SS=1°, and RS=0.3 mm. As shown in FIG. 3, in the ordinary potassium octa-titanate fine particles of prior art, sharp peaks showing the crystallinity are seen but the potassium octa-titanate fine particles of the invention scarcely show any sharp peak. Also, in FIG. 3, with regard to the diffraction intensity ratio of (200)/(310), the potassium titanate fiber of prior art show 10.1 but the potassium titanate fine particles of the invention of Example 1 show 1.3. Furthermore, as shown in Table 1, in the potassium titanate fine particles of the invention of Examples 2 and 3, the diffraction ratio of (200)/(310) of the X-ray diffraction is 3 or lower in each case.

Also, the BET specific surface area of the potassium octa-titanate fine particles of prior art measured was 10.5 $m^2/g$ but the potassium octa-titanate fine particles of the examples of the invention show valued as high as 20 $m^2/g$ or more.

Then, FIG. 4 is a graph of plotting the relation of the breadth and the length with regard to the potassium titanate fine particles of Example 2 of the invention. As shown in FIG. 4, in the potassium titanate fine particles, there are only particles having the length of shorter than 5 μm. Also, almost all the particles (79.5%) of the potassium titanate fine particles of the invention exist in the region A having the length/breadth ratio of less than 3. Also, 20.5% of the particles having the length/breadth ratio of 3 or higher and the length of 5 μm or shorter exist in the region B, but the potassium titanate fine particles of the invention are definitely outside the region C that the breadth is 3 μm or shorter, the length is 5 μm or longer, and the length/breadth ratio is 3 or higher, which are the standard of ILO, etc.

With regard to the potassium titanate fine particles of Example 2, as shown in Table 1, 91.3% of the particles exist in the region A where the length/breadth ratio is less than 3 and 8.7% of the particles exist in the region B where the length/breadth is 3 or higher. With regard to the potassium titanate fine particles of Example 3 of the invention, all the particles exist in the region A only.

TABLE 1

| Ex. | Length/breadth ratio | Number ratio (%) | Length (μm) | | | Breadth (μm) | | | Length/breadth ratio | | | BET specific surface area (m²/g) | X-ray diffraction (200)/(310) intensity ratio |
|---|---|---|---|---|---|---|---|---|---|---|---|---|---|
| | | | Min. | Max. | Ave. | Min. | Max. | Ave. | Min. | Max. | Ave. | | |
| 1 | <3 | 91.3 | 0.07 | 2.57 | 0.73 | 0.03 | 2.13 | 0.51 | 1.00 | 2.75 | 1.40 | 46.7 | 1.3 |
|   | ≧3 | 8.7 | 0.15 | 9.13 | 1.12 | 0.04 | 0.51 | 0.14 | 8.42 | 21.21 | 8.34 | | |
| 2 | <3 | 79.5 | 0.09 | 0.74 | 0.29 | 0.04 | 0.47 | 0.22 | 1.00 | 2.68 | 1.39 | 35.1 | 0.6 |
|   | ≧3 | 20.5 | 0.23 | 1.67 | 0.66 | 0.04 | 0.19 | 0.09 | 3.86 | 16.17 | 7.15 | | |
| 3 | <3 | 100 | 0.19 | 4.42 | 1.32 | 0.07 | 3.13 | 0.92 | 1.00 | 2.89 | 1.51 | 22.3 | 2.8 |
|   | ≧3 | 0 | — | — | — | — | — | — | — | — | — | | |

Ex.: Example; Min.: Minimum; Max.: Maximum; Ave.: Average; temp.: temperature

As described above, the potassium titanate fine particles of the invention contain no particles having the size of causing problems in a hygiene aspect and can be widely used as raw materials for various uses.

What is claimed is:

1. Potassium titanate fine particles comprising the particles having the length of shorter than 5 μm and the content of the fine particles having the ratio of the length to the breadth of less than 3 is from 70% to 100% by particle number.

2. The potassium titanate fine particles according to claim 1 wherein the specific surface area thereof is from 20 to 50 m²/g.

3. The potassium titanate fine particles according to claim 1 wherein the diffraction intensity in the X-ray diffraction of the particles is low and the particles are low crystallinity.

* * * * *